Dec. 1, 1925.  
F. CREEDY  
CASCADE MACHINE  
Filed July 30, 1921  
1,563,474  
9 Sheets-Sheet 2
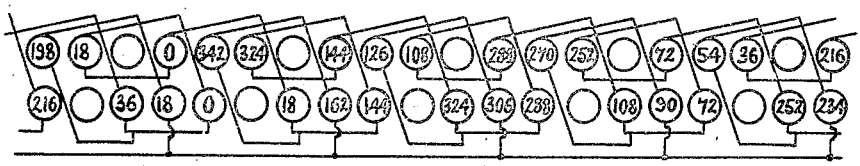
Fig. 2.   4 & 6 Poles.
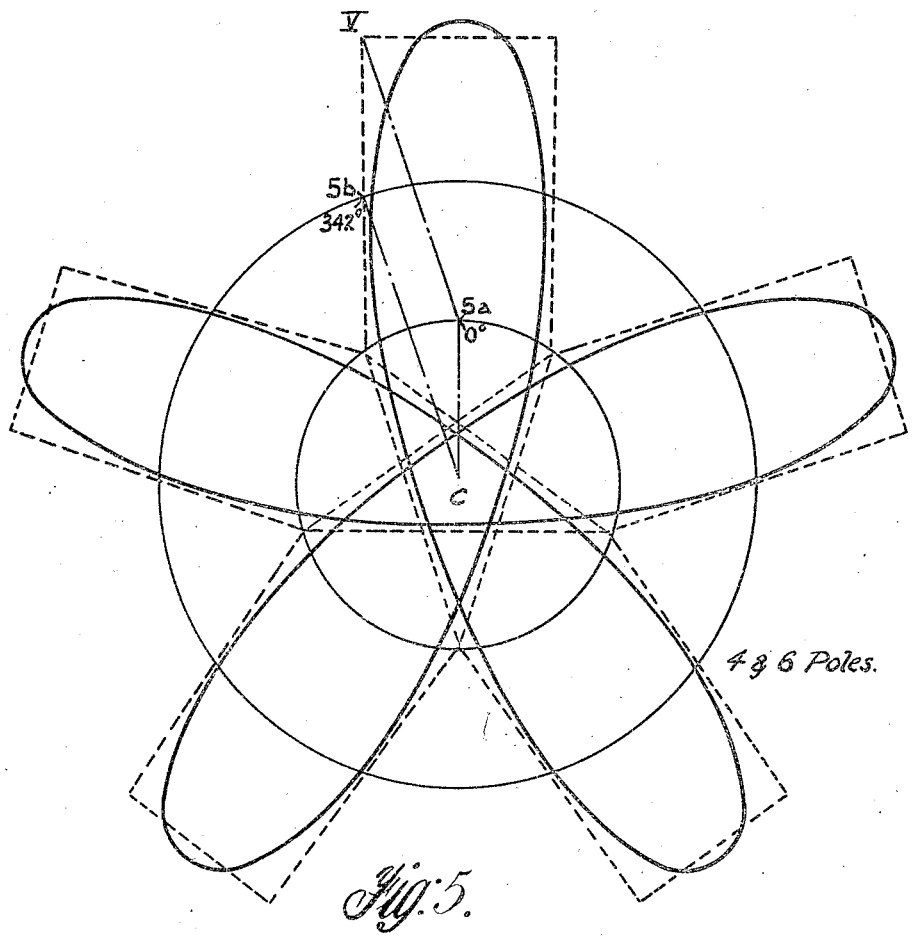
Fig. 5.   4 & 6 Poles.
INVENTOR.  
Frederick Creedy.  
by A. E. Wall  
Attorney.

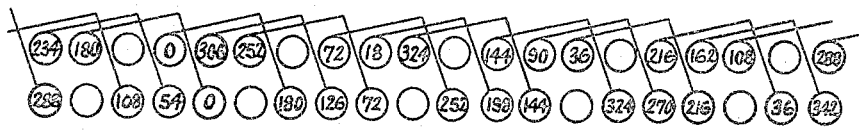
*Fig. 3.*   2 & 8 Poles.
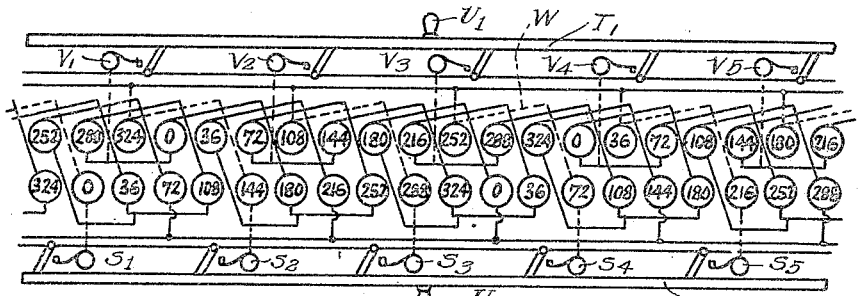
*Fig. 4.*   8 Pole.
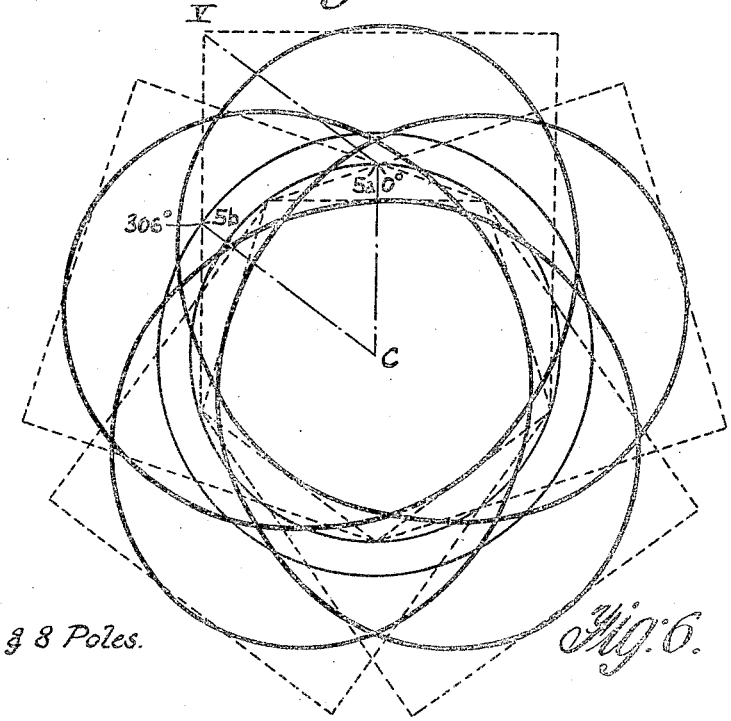
2 & 8 Poles.   *Fig. 6.*

Dec. 1, 1925.  
F. CREEDY  
CASCADE MACHINE  
Filed July 30, 1921   9 Sheets—Sheet 4

1,563,474

INVENTOR.  
Frederick Creedy,  
by A. E. Odell  
Attorney.

Dec. 1, 1925.
F. CREEDY
CASCADE MACHINE
Filed July 30, 1921　　9 Sheets-Sheet 5
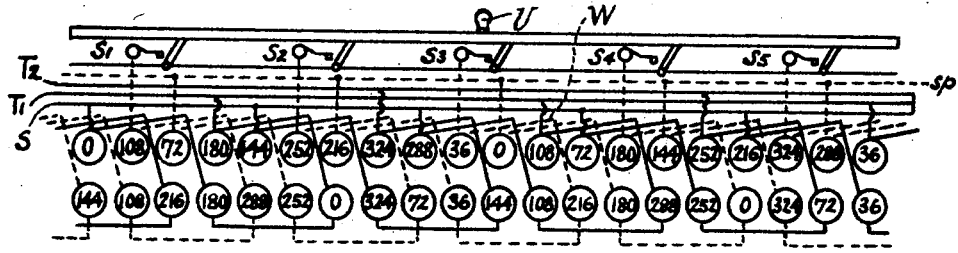
Fig. 10.　12 & 8 Poles.
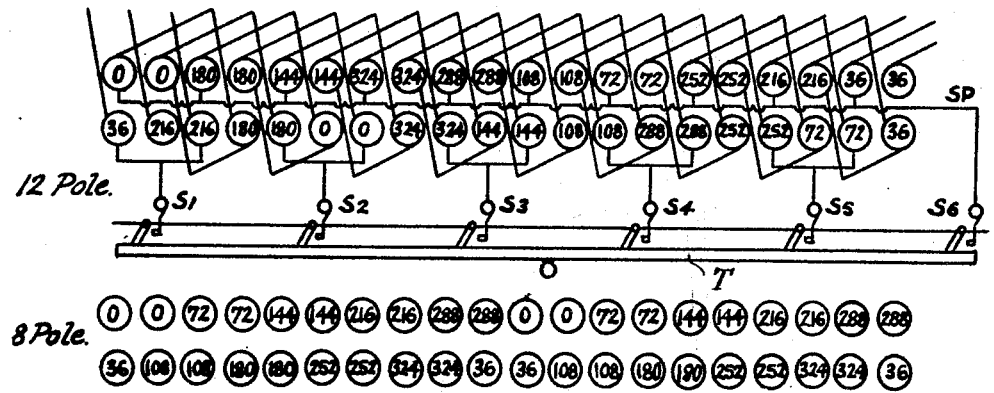
Fig. 11.
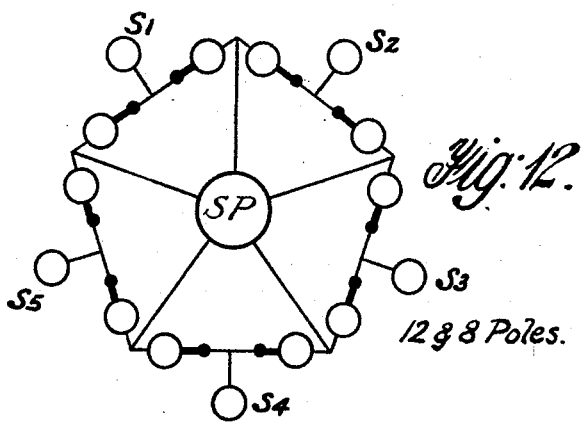
Fig. 12.
12 & 8 Poles.
INVENTOR.
Frederick Creedy
by. Attorney.

Dec. 1, 1925.

F. CREEDY 1,563,474

CASCADE MACHINE

Filed July 30, 1921  9 Sheets-Sheet 6

5 & 7 Poles.

INVENTOR.
Frederick Creedy.
by. A. P. Odell
Attorney.

Dec. 1, 1925.
F. CREEDY
1,563,474
CASCADE MACHINE
Filed July 30, 1921 9 Sheets-Sheet 7
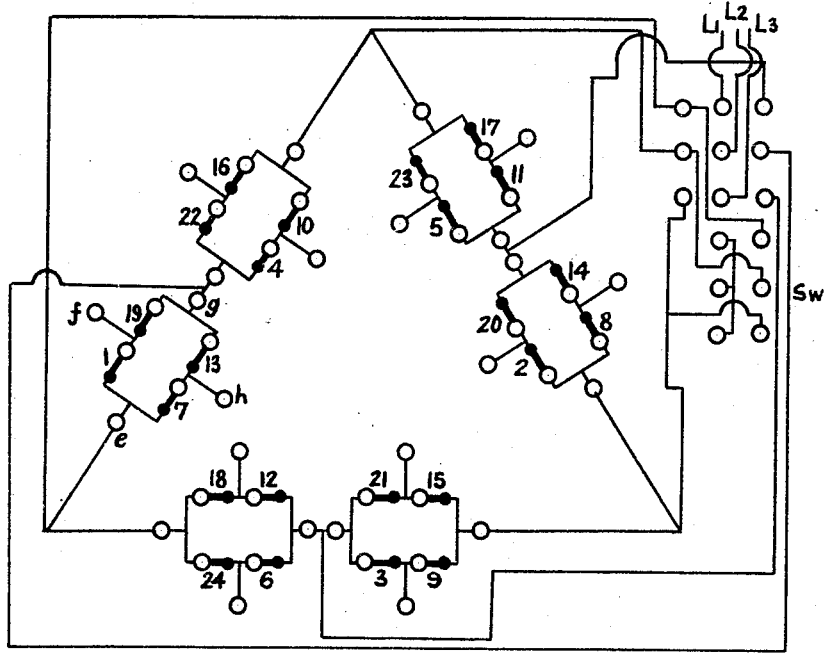
8 or 16 Pole Primary.
12 or 4 Pole Secondary.
*Fig. 14.*
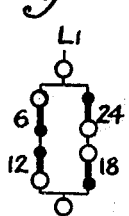
12 Pole Primary.
8 Pole Secondary.
*Fig. 15.*
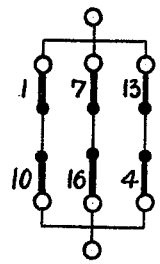
*Fig. 17.*
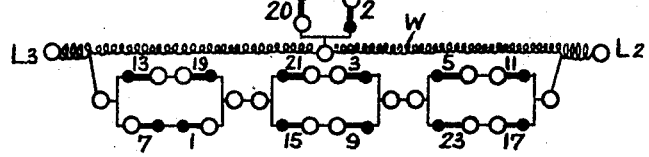
INVENTOR.
Frederick Creedy.
by. O. E. Odell
Attorney.

Dec. 1, 1925.

F. CREEDY

CASCADE MACHINE

Filed July 30, 1921   9 Sheets-Sheet 8

2 or 6 Pole Primary.
6 or 2 Pole Secondary.
or 6 or 18 Pole Primary.
18 or 6 Pole Secondary.

INVENTOR.
Frederick Creedy.
by A. E. Odell
Attorney.

Patented Dec. 1, 1925.

1,563,474

UNITED STATES PATENT OFFICE.

FREDERICK CREEDY, OF ILKLEY, ENGLAND.

CASCADE MACHINE.

Application filed July 30, 1921. Serial No. 488,686.

*To all whom it may concern:*

Be it known that I, FREDERICK CREEDY, a subject of the King of Great Britain and Ireland, and a resident of 10 Ashburn Place, Ilkley, Yorkshire, England, have invented certain new and useful Improvements in Cascade Machines (on which application has been made for Letters Patent in Great Britain, No. 23123, filed on 5th August, 1920; and No. 36540, filed 30th December, 1920), of which the following is a specification.

The present invention relates to alternating current cascade machines.

With a pair of induction motors coupled in cascade in the known manner with the rotor windings of one connected to the stator windings of the second, the rotor windings of the second are connected through resistances. At starting these resistances are gradually cut out whereby the motor comes up to its cascade speed. The rotor windings of the first machine may also be connected through resistances the gradual cutting out of which causes the speed to rise until when they are short circuited, the second motor is cut out and the machine runs at a speed corresponding to the pole number of the field produced by the stator winding of the first machine.

The advantages of operating alternating current motors in cascade have led to the development of a type of machine equipped with two windings upon both stator and rotor, interconnected and controlled in the same manner as the windings of two separate cascade-connected motors. From this in turn a certain number of designs have been arrived at in which a single winding on each part reproduces the effect of the two windings which it replaces.

The present invention relates to machines of this latter kind, herein referred to as internal cascade machines. Its first and main purpose is vastly to increase the range of usefulness of such machines. Subsidiary aims contributing to this end are to enable windings, and therefore machines, to be constructed for pairs of pole numbers of other ratios than 2:1; to facilitate and improve the design of internal cascade windings; to provide secondary internal cascade windings capable of operating upon more than one pair of poles; to provide primary windings to co-operate with such secondary windings by producing a field of any one of a plurality of different pole numbers, and by acting as a secondary on any one of a plurality of pole numbers; to provide improved means for causing an internal cascade machine to rise to and run at a speed corresponding to one of its basal pole numbers, herein termed a basal speed, and thereby to enable the construction of machines of many and wide ranges of speed variation; and also further to increase the flexibility of a machine by providing a winding capable of acting as a secondary and simultaneously or alternatively as a primary.

With these purposes in view my invention comprises in one aspect thereof, an internal cascade winding presenting four, five, or more concentrations of ampere conductors around its periphery, and otherwise conforming to the conditions explained below, whereby it is adapted to produce fields of two different pole numbers the sum of which is equal to the number of concentrations of ampere conductors. My invention includes also general methods of design of such windings, and in addition certain specific windings not all derivable from those general methods but involving further inventive steps. In a more complete embodiment my invention consists in an internal cascade machine, having such a winding as just mentioned upon one member, and suitable primary windings upon the other member; and my invention includes primary windings for this purpose, adapted also to act as secondary windings upon a second pole number. In such a machine my invention provides improved means for hindering rotation of the primary field with respect to the rotor, and thereby causing the rotor to attain a basal speed. In its fullest development my invention contemplates an internal cascade motor having secondary windings adapted to operate on more than one pair of pole numbers, and primary windings adapted to produce various primary fields and to act as secondaries in other fields, together with means for changing the primary pole number, and for resistance control of the secondary, whereby the machine may be brought without shock from one to another of a wide range of speeds.

In the accompanying drawings:—

Figure 2 is a diagram of a specific cascade winding;

Figure 3 shows the phases of currents in it on a different pole number;

Figure 4 shows the winding modified to enable the motor to attain another than the cascade speed;

Figures 5 and 6 show the distribution of ampere-conductors in this winding;

Figure 8 is another form of the diagram of Figure 2;

Figures 9 to 13 are other specific rotor windings illustrated by diagrams of the form of Figure 2 or Figure 8;

Figures 14 to 17 represent stator windings adapted to co-operate with the rotor windings described.

Figure 1:
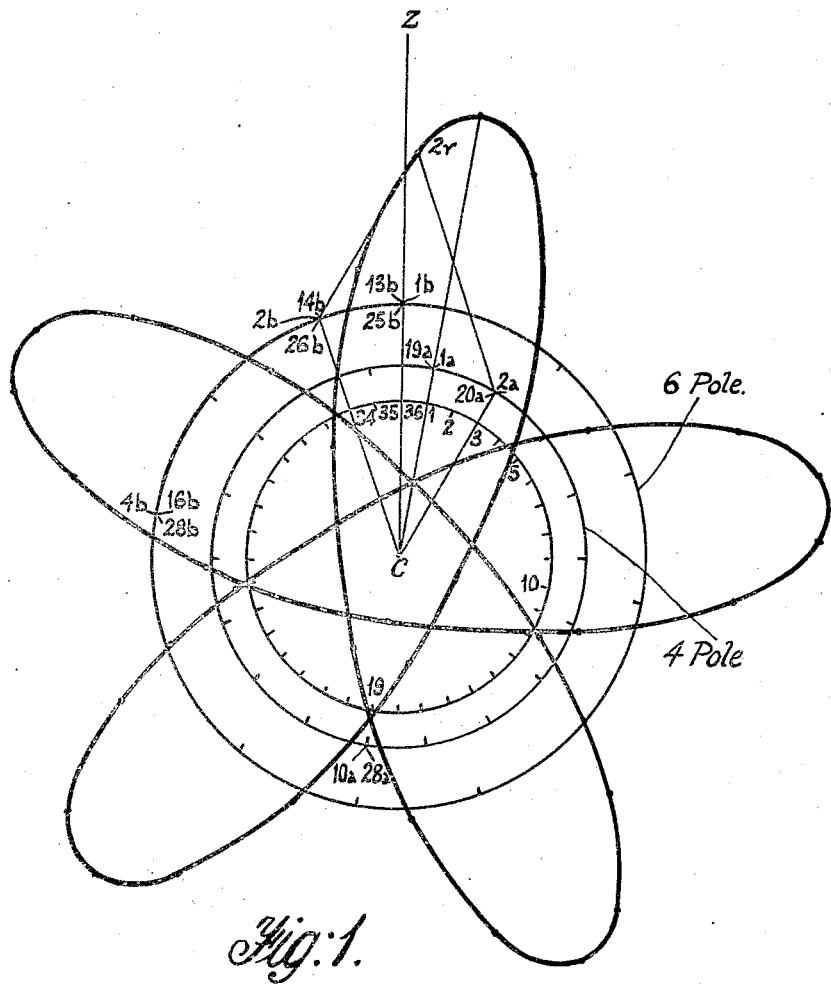
Figure 1 is a diagram explaining the ideal distribution of ampere conductors in a single rotor winding acting as a secondary on one pole number and as a primary on another.

In a single or internal cascade machine having a single winding on each member the winding on one member, i. e., the stator or the rotor, acts as a primary to produce a field of one pole number (this will be called a field of P pole pairs) and as a secondary in a field of another pole number (this will be called a field of Q pole pairs), this latter field being produced by the winding on the other member. Thus this latter winding acts as a secondary in a field of the said one pole number (P pole pairs) and as a primary to produce the field of the said other pole number (Q pole pairs).

Heretofore it has not been possible to build internal cascade machines to operate on fields in which the ratio of P to Q is other than 2 to 1.

I have now discovered how windings for such machines may be constructed to operate on fields in which the ratio of P to Q may be any value.

Two distinct types of internal cascade machines may be distinguished according to whether the two fields inter-linking the windings on one member, for example, the stator, revolve in opposite directions with respect to the other member, for example, the rotor, or whether they revolve in the same direction. The former type is known as the normal or cumulatively cascaded motor and the latter as the differentially cascaded motor.

My invention partly consists in a single winding for the secondary member, i. e., the winding not connected to the supply, in which the number of ampere conductors per slot is not constant as in the ordinary types of armature winding, but presents a number of maxima and minima equal to P plus Q for a normal or cumulatively cascade motor arranged for P and Q pole pairs, and P—Q for a differentially cascaded motor. Referring for the moment only, to the normal type of motor the winding will usually be made up of P plus Q circuits symmetrically distributed round the circumference and carrying symmetrical polyphase currents of $$\frac{P \text{ plus } Q}{\text{GCM of P and Q}} \text{phases.}$$

GCM means greatest common measure. A winding having the above characteristics is capable of acting as a cascade secondary winding, but it will be understood that some types of winding are superior to others, and methods whereby the best designs may be worked out will be described later.

$$\frac{P \text{ plus } Q}{\text{GCM of P and Q}}$$

is constant for any given ratio between the pole numbers; thus any pair of pole numbers in the ratio of 2 to 1 with fields rotating in opposite directions with relation to the member on which the secondary winding is arranged, can be dealt with by three-phase internal cascade windings, such as have already been devised, but three-phase windings will not serve for any other ratio of pole numbers for fields rotating in opposite directions.

I have discovered that pairs of pole numbers in the ratio of 3 to 2 can be used if the winding is designed for five phases. Pairs of pole numbers in the ratio of 4 to 3 necessitate seven phases, and so on. But five phases is also an appropriate number for pole numbers in the ratio of 4 to 1 and seven phases is also the appropriate number for the ratio of pole numbers 5 to 2 and 6 to 1 and so with the higher number of phases.

Figures 8, 9:
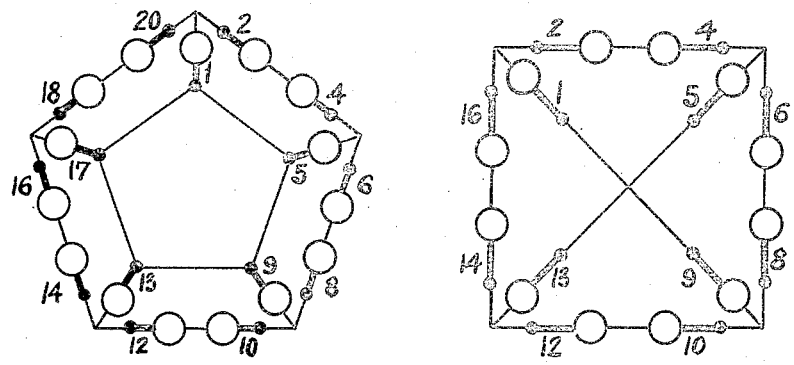

Reference will now be made to Figure 2 of the drawings which shows a secondary winding in accordance with the present invention suitable for 4 and 6 poles. It is spread over 20 slots numbered in the figure; the coils have a slot pitch of 1–4. The winding is built up of 5 elements connected in mesh (each element consisting of two sections connected in series reversed), together with 5 elements (each consisting of a single section), joined in star and to the junctions of the 5 mesh-connected elements. Each section consists of an upper conductor in one slot joined to a lower conductor in another slot (or of a number of such coils in series). This structure of the winding will be more readily understood from Figure 8, which is another diagrammatic representation of the same winding; a section shown in Figure 8 as a black circle joined to an open circle, corresponds with a section of Figure 2. The sections of Figure 8 are numbered with the number of the slot of Figure 2 which contains the upper conductor of the section. It will be seen that the even numbered sections are all in mesh, and the odd numbered in star, the upper conductor of an odd section being joined to the junction of the lower conductors of the even sections on each side of it. It is obvious from Figure 8 that the winding presents five symmetrical closed circuits, each star section being common to two circuits.

The phase difference between corresponding bars of these circuits when the winding is used in a 4 pole field, will be $$\frac{360° \times \text{No. of pole pairs}}{P+Q} = \frac{2 \times 360°}{5} = 144°.$$

The phases of the currents in the respective conductors may, therefore, be marked on Figure 2 as follows. Any five evenly spaced conductors, say the upper conductors of slots 4, 8, 12, 16, 20 may be marked 0°, 144°, 288°, 72°, 216°; the connections of the winding then show that the phase of the lower bar of slot 5 must be 0°, that of the upper bar of slot 2 and the lower bar of slot 7 must be 180°, and similarly determines the phase of all the mesh-connected conductors; the phase of the lower bar of slot 8 must be intermediate between the phases of the lower bars of slots 7 and 9, which determines it to be 162°, and determines the phase of the upper conductor of slot 5 as 342°; and so on for the remaining star-connected bars. The coils have a slot pitch of 1 to 4, i. e. a normal pitch which is understood to be a pitch of from slot 1 to slot $3n+1$, where $n$ is the number of slots per section. In the figure $n=1$.

Figure 3 shows a secondary winding suitable for 2 and 8 poles, thus the winding being suitable for 4 and 1 pole pairs it gives 5 maxima of ampere conductors and therefore is similar to the winding described with reference to Figure 2, which is suitable for 2 and 3 pole pairs. The winding in Fig. 3 is connected exactly as the winding in Fig. 2, the phase difference of the currents in corresponding conductors being different. The phase difference between the circuits when the winding is used in a 2 pole field is $$\frac{1 \times 360}{5} = 72°,$$

from which, as has been described with reference to Fig. 2 the phases of the currents in the respective conductors may be marked on the figure. This has been done. It will be understood that the connections of the winding have, however, been omitted for the sake of clearness. The winding has 5 symmetrical circuits and is arranged exactly in the form illustrated in Fig. 8, the said circuits being equally spaced round the circumference and carrying 5 phase currents.

The phase difference between the circuits in the 8 pole field is similarly 288°, but since the 8 pole field revolves in the opposite direction to the 2 pole field, the phase difference must be considered as 360°—288°, which is 72°. Hence the same result is obtained whichever field is considered.

This illustrates a fundamental principle of the invention, namely, that the relation between the number of concentrations of ampere conductors round the periphery of the machine and the pole pairs P and Q must be such that the phase difference between the E. M. F.'s in corresponding bars of adjacent circuits on the one pole number for example P, measured in a clockwise direction, is the same as the phase difference between the E. M. F.'s in the same bars on the other pole number, namely Q, when measured in a counter-clockwise direction.

The windings illustrated in Figs. 2 and 3 are typical of a large class of windings. For example, a winding for 2 and 6 poles requires 4 phases and may be wound in 16 slots so that it may be represented (since it gives magnetic balance without duplication) by ⅘ of the diagram of Fig. 3.

Fig. 9 is another diagrammatic representation of such a winding for 2 and 6 poles, this diagram showing the arrangement of the 4 circuits in a manner similar to that in which Fig. 8 illustrates the 5 circuits of the winding described with reference to Fig. 2. It will be understood that in Fig. 9 a section consisting of an upper conductor in one slot joined to a lower conductor in another slot (or a number of such coils in series) is represented as a black circle joined to an open circle, as in Fig. 8, and this arrangement is employed throughout the present specification.

Fig. 4 also shows a secondary winding of the type illustrated in Figs. 2 and 3 but with arrangements to enable the speed of the machine to rise from the cascade speed to a speed corresponding to one of its basal or primary pole numbers. The numbers indicate the phases of the currents in the conductors when the winding is used in a four pole field, and at its basal speed.

A portion of the winding W shown in dotted lines is wound into the slots shown empty in Figures 2 and 3. This portion of the winding is connected to slip rings $S^1$, $S^2$, $S^3$, $S^4$, $S^5$. A switch T having an operating handle U may be operated to connect the slip rings $S^1$ to $S^5$, and thus short circuit the portion of the winding W when the fluxes are hindered from rotating with respect to the secondary member on which the windings are carried and the machine runs at a speed corresponding to the primary or basal pole number.

The cascade winding is also connected at the mid points of the mesh to slip rings $V^1$, $V^2$, $V^3$, $V^4$, $V^5$, which may be connected together by means of a switch $T^1$ having an operating handle $U^1$, whereby the cascade winding is arranged in a number of closed circuits which is no longer equal to or a sub-multiple of the sum of the two numbers of pole pairs P and Q. Thus when the switches T and $T^1$ are operated to connect the slip rings $S^1$ to $S^5$ together and the slip rings $V^1$ to $V^5$ together the machine will run at its basal speed.

With this winding all the slots on the member carrying the winding are filled.

Figure 7:
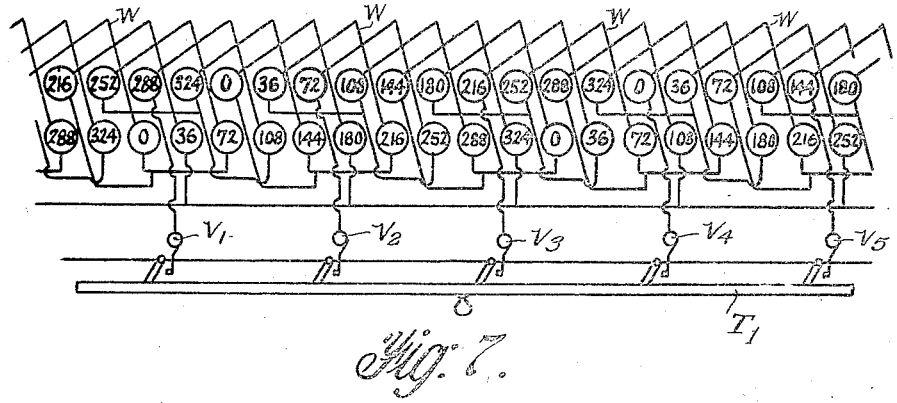
Figure 7 shows a further modification of the winding for enabling the motor to attain another than cascade speed.

Figure 7 shows the winding of Figure 4 with each phase of the cascade winding arranged to be short circuited through one section of the portion W by means of the switch $T^1$, which is employed to connect the slip rings $V^1$, $V^2$, $V^3$, $V^4$, $V^5$ to which the upper bars of the portion W are connected. When the switch $T^1$ is closed the effect is the same as is described with reference to Figure 4 whereby the machine will run at its basal speed.

Figure 10 shows a cascade or secondary winding for 4 and 6 poles and having a number of open circuited sections W with means to close the circuits of said sections for the purpose of enabling the machine to run at its basal speed, but without means for connecting the cascade winding in a number of closed circuits. The numbers indicate the phases of the currents in the conductors when the winding is used in a 4 pole field. The portion of the winding W, which is shown in dotted lines, fills the slots not filled by the remainder of the winding which is shown in full lines. The latter part consists of 10 sections each composed of two coils in series reversed, one end of each of the sections being joined to a common star point S, while the other ends are joined alternately to one of two terminals $T^1$, $T^2$. For cascade operation the terminals $T^1$, $T^2$ and S are permanently short-circuited. The sections of the portion W are joined at one end to a common star point $sp$ and at the other end to five slip rings $S^1$, $S^2$, $S^3$, $S^4$, $S^5$. T is a switch having an operating handle U by means of which the slip rings may be connected together and the portion of the winding W short-circuited and the machine be caused to run at its basal speed.

Figure 11 shows a cascade or secondary winding arranged similarly to that of Figure 7. The numbers indicate the phases of the currents in the conductors when the winding is used in a 6 pole field; below are represented the conductors with the phases of the currents when the winding is used in a 4 pole field. The winding is built up of 5 elements connected in mesh, each element consisting of two sections connected in series reversed, and each section comprising two coils. The winding is shown as having both terminals of every element joined to a common star point SP. The mid points of all elements are brought out to slip rings $S^1$–$S^5$, and the star point to a slip ring $S^6$, and when all of these are short-circuited together by means of the switch T the machine runs at its basal speed.

Figure 12 is a diagrammatic representation in the manner of Figure 8 of the winding of Figure 11.

The angles of the lines representing sections of winding in Figures 8, 9 and 12 indicate the relative phases of the currents in the sections.

Figure 13:
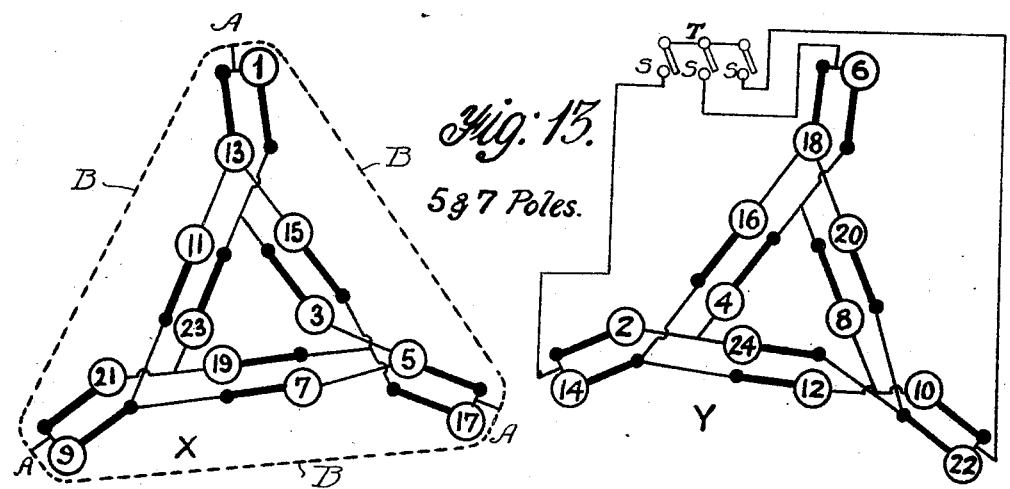

Fig. 13 shows another star-mesh cascade winding of the same general type as Fig. 8 arranged for 5 and 7 pole pairs. It is of 24 sections which are numbered in order around the circumference of the machine and which fall into two separate groups X and Y. The phases of the E. M. F.'s in the several sections of the winding when operating in a field of 14 poles rotating counter-clockwise and when operating in a field of 10 poles rotating clockwise are as shown in the following table:—

| Number of section | Phase in 10-pole field | Group to which section belongs | Phase in 14-pole field | Phase in 14-pole field reversed |
|---|---|---|---|---|
| 1 | 0 | X | 0 | 0 |
| 2 | 75 | Y | 105 | 255 |
| 3 | 150 | X | 210 | 150 |
| 4 | 225 | Y | 315 | 45 |
| 5 | 300 | X | 60 | 300 |
| 6 | 15 | Y | 165 | 195 |
| 7 | 90 | X | 270 | 90 |
| 8 | 165 | Y | 15 | 345 |
| 9 | 240 | X | 120 | 240 |
| 10 | 315 | Y | 225 | 135 |
| 11 | 30 | X | 330 | 30 |
| 12 | 105 | Y | 75 | 285 |
| 13 | 180 | X | 180 | 180 |
| 14 | 255 | Y | 285 | 75 |
| 15 | 330 | X | 30 | 330 |
| 16 | 45 | Y | 135 | 225 |
| 17 | 120 | X | 240 | 120 |
| 18 | 195 | Y | 345 | 15 |
| 19 | 270 | X | 90 | 270 |
| 20 | 345 | Y | 195 | 165 |
| 21 | 60 | X | 300 | 60 |
| 22 | 135 | Y | 45 | 315 |
| 23 | 210 | X | 150 | 210 |
| 24 | 285 | Y | 255 | 105 |

From a comparison of the second and last columns of the table it is apparent that the phases in the sections of groups Y are opposite when the winding operates in the two fields respectively. From this it is clear that a portion of the winding X operates on 10 or 14 poles, since the phases of the E. M. F.'s in the sections are the same on both these pole numbers; the phases of the E. M. F.'s in the group Y are opposed on the 10 and 14 pole fields, which means that in the conductors in each slot occupied by this group opposite E. M. F.'s are induced by the two fields so that the group Y of the winding is, for cascade operation, not required. Thus, the terminals AAA of the group X are short-circuited as indicated in Fig. 17 by dotted lines B, B, B and the terminals of the winding Y are connected to slip rings S, S, S.

T is a switch by which the slip rings may be short-circuited. For cascade operation the switch T is open and to cause the machine to rise to its basal speed the switch T is closed to short-circuit the slip rings and thus connect the terminals of the group Y.

It has been pointed out that the characteristics of a winding for a given pair of pole numbers are also the requisite characteristics for certain other pole numbers. I have discovered that a winding adapted for a given cascade speed may, if suitably designed, operate on any pair of pole numbers, the sum of which corresponds to that speed. Consequently if primary windings are provided capable of producing one pole number, and acting as a secondary to the other pole number on each of two or more pairs of pole numbers giving the cascade speed for which the secondary winding is designed, the motor will run satisfactorily at the cascade speed, whichever of its pole numbers the primary windings are producing; and the primary windings may be changed from the one pole number to the other without affecting the running of the motor. Changing the pole number will merely change the order in which the phases occur in the secondary; for instance, a set of five phases is capable of two distinct orders, viz, 0°, 72°, 144°, 216°, 288° and 0°, 144°, 288°, 72°, 216°; the first order corresponds to, say, 2 and 8 pole pairs, and the second to 4 and 6 pole pairs; in general $n$ phases are capable of $$\frac{n-1}{2}$$

possible orders. It follows that if the secondary member has short-circuiting means for producing additional circuits as described, for example, with reference to Figures 4 or 7 it may be caused to pass from the cascade speed to the higher basal speed corresponding to any of the pole numbers the primary winding can produce, by first causing the primary winding to produce the desired pole number, and then closing the short-circuiting means of the secondary. Thus, if the secondary winding is a 5 phase winding, adapted for a cascade speed corresponding to 20 poles, and the primary winding is capable of being modified to produce 4, 8, 12 or 16 poles while acting as a secondary on 16, 12, 8 and 4 poles respectively, the motor will not only run on the 20 pole speed with each modification of the primary winding, but can be raised to a basal speed corresponding to any one of these pole numbers by first modifying the primary winding to produce that pole number and then closing the short-circuiting means of the secondary. As a rule a machine operating on the comparatively low speeds corresponding to 8, 12, 16 and 20 poles will not be required to operate on 4 poles.

For simple cascade working it is easy to provide two distinct windings on the stator. For in any set of evenly spaced sections a balanced system of polyphase E. M. F's will be generated by a field of any number of pole pairs which is not equal to or a multiple of the number of sections; so that if such a set of sections are joined in series the resultant E. M. F. in them will be zero. Hence star-connected windings devoid of parallel circuits, designed for any two pole numbers which are not multiples the one of the other, will be mutually non-inductive. But there is a great advantage in employing a single stator winding, particularly where the machine works on more than one pair of pole numbers; and it is possible to do so in many cases.

Some typical stator windings are next described suitable to co-operate with rotor windings such as have been described above.

Figures 14 and 15 show a winding of 24 sections adapted to act as a primary on 16 poles and as a secondary on 4 poles, as a primary on 4 poles and as a secondary on 16 poles, as a primary on 12 poles and as a secondary on 8 poles, and as a primary on 8 poles and a secondary on 12 poles. The principles of its construction, however, are applicable to any pair of pole numbers which divided by their G. C. M. give the one an even and the other an odd quotient.

The winding is built up of units each of which includes four sections evenly spaced around the periphery of the stator and represented by a line joining a black circle to an open circle, as for example, sections 1, 7, 13, 19. Each section consists of one or more coils in series. Now on 4 and 12 poles, sections 1 and 7 will be in opposition of phase, and so will sections 13 and 19; on 8 and 16 poles all four sections will be in phase. Section 19 is joined in series with section 1, and section 13 in series with section 7; the pairs 19, 1 and 13, 7 are then joined in parallel to form a closed circuit in which the beginning of section 19 is connected to the beginning of section 13, and the end of section 1 to the end of section 7. Terminals $e$, $f$, $g$, $h$, are connected to the junctions of the sections. If terminals $e$, $g$ are connected to a source of supply and terminals $f$, $h$ are joined through a resistance, the primary currents will be such as are required for 8 and 16 poles, while secondary currents such as would be induced by a 4 or 12 pole field can flow through terminals $f$, $h$ and the resistances. If conversely terminals $f$, $h$ are joined to a source of supply and terminals $e$, $g$ are joined through a resistance, the primary currents will correspond with 4 or 12 poles, and an 8 or 16 pole field can induce secondary currents through the resistance.

There are six such units in the winding which may be numbered 1 to 6, each taking the number of the lowest numbered section in it. For 16 poles they are joined in a three-sided mesh, the sides being formed by pairs of units in series, viz: 1 and 4, 2 and 5, 3 and 6; the angles of this mesh may be joined to a three phase supply $L^1$, $L^2$, $L^3$, through the switch SW by putting it over to its left hand position. If, instead, the switch is put to the right, the angles of the mesh are short-circuited and the mid-points of its sides are joined to the supply; units 1 and 4 are then in parallel and form one arm of a star, and so with units 2 and 5, and 3 and 6. So connected the winding gives 8 poles.

Figure 15 also shows a stator winding of 24 sections built up of units each of which includes four sections evenly spaced around the periphery of the stator in the manner of the winding illustrated in Fig. 14. Referring to the units by the lowest numbered section in each, units 2, 4 and 6 are in series between one pole $L^1$ of the source and the mid-point of the winding of an auto-transformer W connected to terminals $L^2$, $L^3$ of the supply; units 1, 3 and 5 are also in series and tapped across a part of the transformer winding giving 0.866 of the line voltage. This winding acts as a primary on 12 poles and as a secondary on 8 poles.

Figure 16:
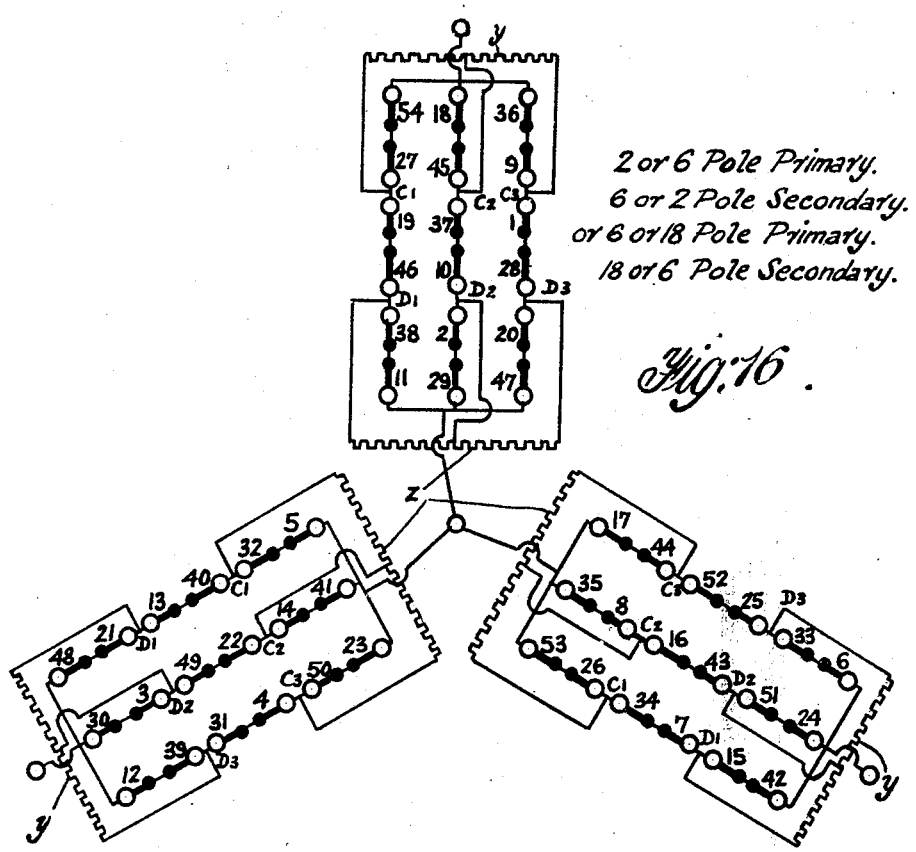

Figure 16 shows a stator winding for 2 and 6 poles, that is, in which the numbers of pole pairs are both odd. This winding may be employed with a rotor winding of the kind illustrated in Fig. 9 for a motor capable of running at the cascade speed corresponding to 8 poles and at basal speeds corresponding to 2 and 6 poles respectively.

The winding has 54 sections and is built up of units each comprising two oppositely connected sections, as for example, 1 and 28; three such units are connected in series, and three such sets of three units are connected in parallel, corresponding sections of the three parallels, for example, 18, 36 and 54 being evenly spaced round the stator.

Variable resistances $y$ are connected between the junctions $C^1$, $C^2$, $C^3$ of the first and second units in the three parallels and other resistances Z between the junctions $D^1$, $D^2$, $D^3$ of the second and third units. Three sets of three parallels are connected at one end to a common star point and at the other end to the terminals of a three-phase supply.

The directions of the lines representing the sections represent the relative phases of the E. M. F.'s in the sections.

Fig. 16 may be also regarded as representing a winding of 162 sections, each of the sections shown standing for three evenly spaced sections in series; thus, section 54 would represent sections 54, 108, and 162 in series and 27 would represent 27, 81 and 135 in series. Such a 162 section winding will act as a primary on 18 poles and as a secondary on 6 poles.

If starting resistances can be dispensed with, as when a large starting torque is not required, the winding may have 18 sections only, each phase still containing three parallel branches, with corresponding pairs of the three branches spaced equally round the machine, and each branch comprising only a single mutually reversed pair of diametrically opposite sections. One phase of a winding arranged in this way is illustrated in Fig. 17.

The conditions which any winding must fulfil which is to act simultaneously as a primary on one pole number and as a secondary capable of resistance control on another are broadly as follows:

(1) The sum of the E. M. F.'s round any circuits which remain closed when the resistances are open circuited must be zero (or very small). This is to ensure that all secondary currents pass through the resistances and do not circulate within the winding itself, which would make regulation impossible.

(2) The sum of the secondary currents flowing towards any junction point of several parallel circuits must be zero. This is to ensure that primary and secondary currents shall be independent so that they may flow simultaneously in the same circuit.

Cascade primary windings usually contain a number of parallels and the simplest way to satisfy the first condition is to ensure that the sum of the secondary E. M. F.'s in each parallel shall be zero. This has been done in the 4-section element described with reference to Figure 14. In the winding of Figure 16 the same aim is attained by connecting in series three evenly spaced sections, for there will be the same E. M. F. in all of them on 6 poles, and on 2 poles they will form a balanced three phase system. In the winding of Figure 16 instead of three simple sections, there are three units connected in series, each comprising two opposite sections, as 1 and 28. They are, it is true, not quite evenly spaced apart, and their phases will not be exactly at 120°; but an approximate compliance with the condition is sufficient. The first of the above conditions is thus met. To satisfy the second the winding is made with three parallels, corresponding sections of the three parallels being sections evenly spaced around the machine, as 18, 36, 54. The sum of the secondary currents flowing to the junction point of the parallels 18, 36 and 54 is zero and thus these secondary currents form a balanced polyphase system.

Even the slight departure from the theoretically desirable condition involved in connecting in series sections which are not evenly spaced may be avoided by the use of overlapping sections, several sections being wound into one slot. But this complication is not justified, for the inexactness will only leave an out-of-balance E. M. F. of about 6% of the E. M. F. across one branch of the winding; and this will produce a circulating current only at starting when the resistances are disconnected; which, moreover, will be small since it must pass through six sections in series; and such as it is will contribute to the starting torque. The effect of these residual currents is not serious, and may be further diminished by connecting corresponding branches only together, forming three star points instead of one, and connecting an additional rheostat to join these star points.

Figure 18:
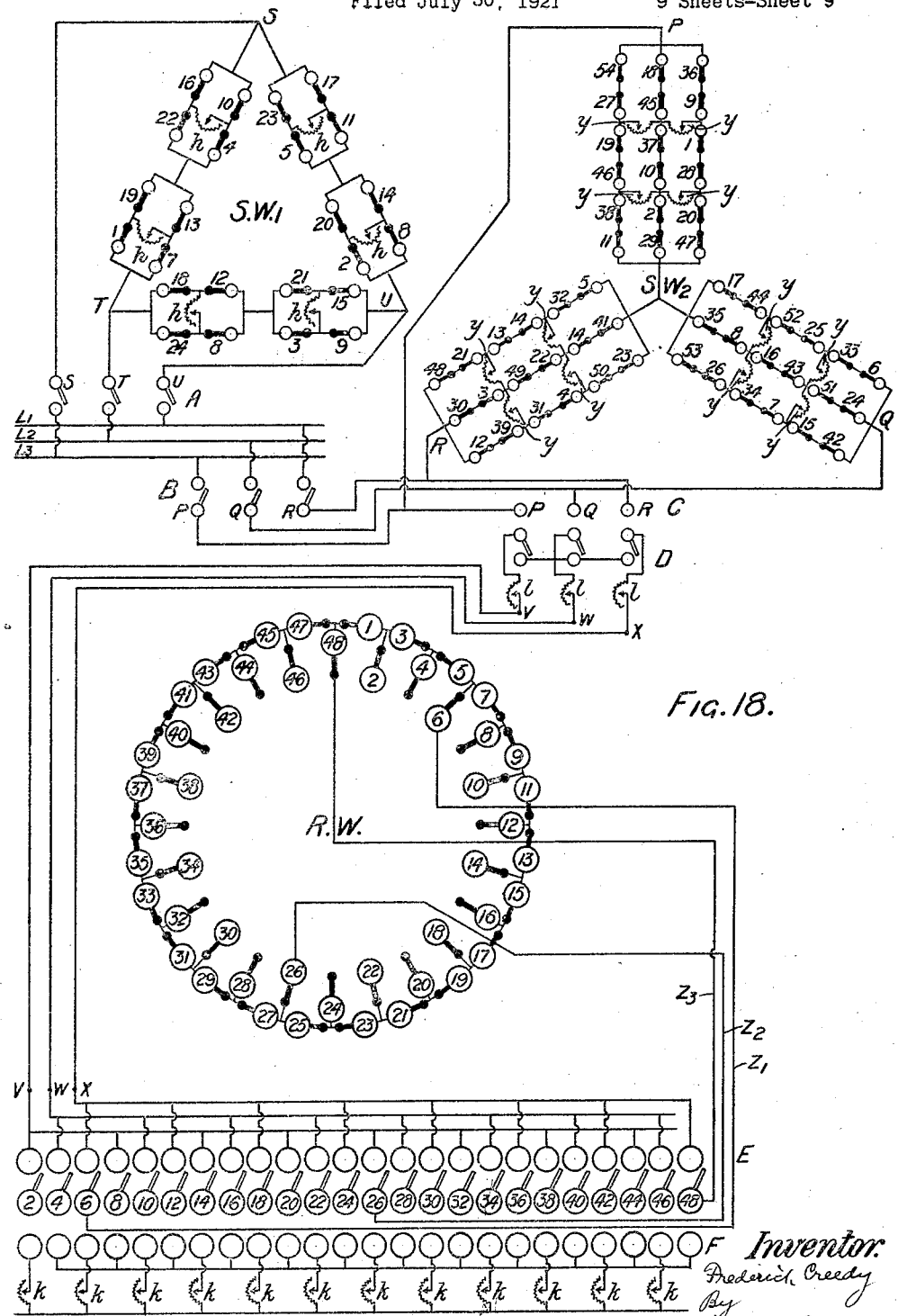
Figure 18 shows the stator and rotor windings of an internal cascade machine according to the invention.

Figure 18 shows the windings of one form of machine according to the present invention. The machine has one winding on the rotor RW and two windings on the stator $SW^1$, $SW^2$. The winding RW is of 48 sections connected in a mesh-star arrangement analogous to that of Figure 8 with the exception that instead of the inner ring short-circuiting half the terminals, the ends of the star sections are brought out to terminals. The winding is thus connected to 24 terminals each of which is connected to an even numbered section. The pitch of each coil of a section may vary within wide limits whereby various ratios of flux densities may be obtained and may differ from the pitch of a winding resulting from the super-position of two component windings. These terminals are connected to switches E, F. $Z^1$, $Z^2$, $Z^3$ show typical connections from the winding $RW^1$ to the switches E, F. To enable this winding to be used as a secondary, control apparatus must be provided for connecting certain of the terminals together directly and through resistances. F is the switch by which this arrangement is brought about and $kkk$ . . . are the resistances. The switch E provides means for connecting the winding to three terminals V, W, and X so that when it is delivering three phase current, such current may be passed to the stator winding. The winding RW is adapted for 6, 8, 16, 18 poles. The stator winding $SW^1$ is of the form illustrated in Fig. 14 of the drawings, that is, it consists of a winding of 24 sections and is built up of units each of which includes 4 sections evenly spaced around the periphery of the stator and arranged to form two parallel paths each consisting of a pair of sections reversed. In each unit the junctions of the two pairs of reversed sections are connected through a variable resistance $h$. Six such units numbered 1 to 6 by the number of the lowest numbered section in it are joined in a three-sided mesh, each side being formed by a pair of units in series. The terminals of the mesh S, T, U are connected to a switch A by which the winding may be connected to the supply $L^1$, $L^2$, $L^3$. The winding $SW^1$ is adapted as a primary for 8 poles. The stator winding $SW^2$ is of the form illustrated in Fig. 16 and has been fully described with reference to said figure. The terminals P, Q, R are connected to a switch B by which the winding may be connected to the supply $L^1$, $L^2$, $L^3$. The winding $SW^2$ is adapted as a primary for 18 poles. The terminals P, Q, R of the winding are also connected to a switch C. The terminals V, W, X of the switch E are connected to a switch D.

For the machine to run at the 24 pole cascade speed the switches A and F are closed whereby the winding $SW^1$ is connected to the supply. On gradually cutting out the resistance $h$ the machine will rise from standstill to the 24 pole speed. On cutting out the resistances $k$ it will rise from the 24 pole cascade speed to the 8 pole basal speed.

By closing the switches B and F the winding $SW^2$ will be connected to the supply instead of $SW^1$ and on cutting out the resistances $y$, which correspond to the resistances $y$, $z$ of Fig. 16 the machine will also rise from standstill to the 24 pole cascade speed. On cutting out the resistances $k$ it will rise from the 24 pole speed to the 18 pole basal speed.

If the switch E be closed the terminals of the rotor winding RW will be connected in sets of 8 so that three phase currents may be led off from it at the terminals V, W, X; by closing switch A, the winding $SW^1$ is connected to the supply; by closing switch C the three phase current from the rotor winding RW will be delivered to the stator winding $SW^2$ through variable resistances 1. On gradually cutting out the resistances 1 the machine will rise to and run at the 26 pole cascade speed and on opening the switch C and closing the switch D the terminals V, W, X are short circuited through the resistances 1, on the cutting out of which the machine will rise to the 8 pole basal speed.

Although cascade motors may be constructed for any combination of pole numbers, yet some such combinations may prove inoperative due to want of magnetic balance, the magnetic pull on the rotor not being balanced in all directions and therefore causing deflection of the shaft.

It was formerly thought that to secure magnetic balance the numbers of pole pairs of the two component fields must have a common factor. But since magnetic pull is proportional to the square of the flux density, it is sufficient to ensure balance if any value of the square of the flux density which occurs at one point occurs also at one or more other points evenly spaced around the rotor with respect to the first. This condition is fulfilled not only when the two numbers of pole pairs have a common factor, but also when they are prime to one another and both odd. For in any field of an odd number of pole pairs diametrically opposite points have equal and opposite magnetic densities; so that the resultant of two such fields must also present equal and opposite densities at diametrically opposite points.

Since the secondary winding is not joined to any external circuit the induced currents must flow in closed circuits in the winding, and since they are balanced polyphase currents there must be a multiplicity of such circuits, equally spaced around the circumference of the secondary member. In order that cascade action may occur the E. M. F. induced in the secondary winding by the primary field must excite a secondary field of a different number of poles, and the E. M. F. due to this secondary field cutting the secondary winding must balance that due to the primary field in all the closed circuits of the winding. This involves that the two E. M. F.'s generated by the two fields considered separately must be of the same frequency and of equal magnitude and opposite phase in each such circuit and not in one only.

This condition establishes the relation between the number of phases in the secondary winding, (and hence the number of sections), and the ratio of the two pole numbers of the machine. If the two numbers of pole pairs P and Q have a common factor CF, the circumference of the machine will present CF similar zones, the quantities $P^1$ and $Q^1$ are the numbers of pole pairs in one of these CF identical zones, i. e., the numbers of pole pairs divided by their G. C. M. If, then two fields of $P^1$ and $Q^1$ pole pairs respectively are to produce E. M. F.'s of opposite phase in each of $n$ equally spaced sections, the phase difference between the E. M. F.'s induced in neighbouring sections by the one field must be equal to the phase difference between the E. M. F.'s induced in the said neighbouring sections by the other field. From this it is deduced that if the two fields rotate in opposite directions the number of sections $n$ must be equal to or a multiple of $P^1+Q^1$ and E. M. F.'s of $P^1+Q^1$ phases must be generated in them.

That the E. M. F.'s generated by the two fields will be of the same frequency follows from the fact that the armature rotates at cascade speed. The provision that they shall be of equal magnitude and opposite phase determines the magnitude and phase of the secondary flux.

In an ideal internal cascade machine there would be two harmonic space distributions of ampere-conductors of different pole numbers rotating uniformly, say in opposite directions, at speeds inversely proportional to the pole numbers. A study of the distribution of ampere conductors corresponding to the resultant of two such component distributions will show what is to be aimed at in the design of a winding, which, being concentrated at particular points of the circumference, namely the rotor slots can only approximate to the ideal distribution.

Referring to Fig. 1 the ampere-conductors per unit length at any point 1 of the circumference may be represented in wellknown manner by the projection upon a datum line C Z of a vector $C^{1a}$ supposed to rotate uniformly at a speed corresponding to the frequency. $C^{1a}$ is the position of the vector at a particular instant herein called the initial instant. The ampere-conductors at any other point of the circumference corresponding to this same component distribution can be represented by a vector of the same length rotating at the same speed, and only differing from $C^{1a}$ in its position at the initial instant. Let the circumference be divided into any arbitrary number of parts, say 36. If the field is a 2-pole field, the vector corresponding to the point 2 would pass through 2 at the initial instant, and so on; that is to say, the vector corresponding to any second point would differ from the vector corresponding to the starting point 1 by the same angle as separates the second point from the starting point. In Figure 1 it is supposed that the first component field is a 4-pole field. Therefore the ampere-conductors at point 19, must be of the same phase as at the diametrically opposite point 1, i. e. are represented by the same vector $C^{1a}$ or $C^{19a}$; and the ampere-conductors at the point 10 will be of opposite phase, and are represented by the vector $C^{10a}$ passing through the point 19. For the 4-pole field then, the vector for any second point differs from the vector for the starting point by twice the angle separating the second point from the starting point. And generally for a field of $P^1$ pole pairs the vector for any second point will differ from the vector for the starting point by $P^1$ times the angle which separates the second point from the starting point.

In Fig. 1, the vectors corresponding to particular points of the circumference are distinguished by appropriate lettering. The points on the inner circle representing the circumference are numbered consecutively 1 to 36; the points on the next circle, as $1^a$, $2^a$, ... representing the vectors corresponding to a 4-pole field have twice the angular spacing of those on the first, and are also numbered consecutively, with the result that each bears two numbers.

The second component field chosen for illustration in Figure 1 is a 6-pole field rotating in the opposite direction to the 4-pole field. The points on the outer circle have therefore three times the angular displacement of those on the inner circle, and are numbered consecutively in the opposite direction; each bears three numbers, as $4^b$, $16^b$, $28^b$.

A vector representing the ampere-conductors for any point of the circumference corresponding to the resultant field may be obtained by compounding the component vectors for that point. The two vectors $C^{2a}$ and $C^{2b}$ are shown thus compounded, giving the vector $C^{2r}$. If a sufficient number of such resultant vectors be plotted the curve shown in Fig. 1 is obtained. Any line drawn from C to this curve, as $C^{2r}$, is a vector which, if rotating uniformly at a speed corresponding to the frequency, represents by its projection on the datum line C Z the ampere-conductors at a corresponding point, as 2, on the circumference of the rotor.

This is a five-lobed curve, with five maxima equal to the sum of the radii $C^{1a}+C^{1b}$ and five minima equal to their difference. The number of maxima is determined by the ratio of the two numbers of poles. For a maximum occurs each time the vectors for the two component fields coincide. If the fields are of $P^1$ and $Q^1$ pole pairs respectively and move in opposite directions, then while the vector for field $P^1$ moves through an angle X that for field $Q^1$ moves through an angle $$X \frac{Q^1}{P^1}$$

Starting from a point on the rotor, as 1, for which the vectors coincide, they will coincide again when the sum of the angles through which they have moved is equal to 360°, i. e. when $$X\left(1+\frac{Q^1}{P^1}\right)=360°$$

i. e., when the vector for the field $P^1$ has moved through an angle $$X=\frac{P^1 \times 360°}{P^1+Q^1}$$

and that for field $Q^1$ through an angle $$X=\frac{Q^1 \times 360°}{P^1+Q^1}$$

The curve closes when the vectors coincide after each has moved through an integral multiple of 360°; this happens when the $P^1$ vector has moved through $P^1 \times 360° = X(P^1+Q^1)$ and the $Q^1$ vector through $Q^1 \times 360° = X(P^1+Q^1)$; whence it follows that the number of coincidences or maxima is $P^1+Q^1$.

The vectors have been considered to represent ampere-conductors per unit distance round the circumference (or per slot). They might equally well represent the E. M. F's per bar or section due to two oppositely revolving fields; when the same argument would show that there are only $P^1+Q^1$ positions where there is a coincidence of phase of the E. M. F.'s due to two such fields, or where there is exact opposition of phase if one field be reversed in phase. Hence it is only at $P^1+Q^1$ points that the two E. M. F.'s can be made to cancel by a right adjustment of their magnitudes. It follows that, as above stated, (save for the exceptional cases where several points of phase opposition can be included in one circuit), secondary windings for $P^1$ and $Q^1$ pole pairs must have $P^1+Q^1$ equally spaced circuits.

For fields rotating in the same direction, the number of maxima in the distribution curve, or the number of equally spaced circuits in the winding, will be $P^1-Q^1$.

The maximum and minimum points in the distribution curve are fixed relatively to the winding to which the distribution is due and are equidistant in space and phase. All the lobes of the curve are of the same shape, and differ only in phase. Hence a winding to give rise to such a curve of distribution must have in it at least as many phases as those of the maxima $P^1+Q^1$ (or twice as many if conductors carrying opposite currents are counted as of opposite phases). It is sometimes found however that a greater number of phases enables the distribution curve to be more exactly produced; and since an extra phase or phases added to the part of the winding producing one lobe involves corresponding additions to all other parts, the total number of phases may require to be some multiple of $P^1+Q^1$. The relation of the phases to one another must be invariable, so that the number of phases can only be thus multiplied, if the multiplication can be brought about by the inter-connection of the sections of the winding in star and mesh, for example as described above with reference to Fig. 2. The winding of Fig. 2 produces only five maxima, and the corresponding diagram (Fig. 8) shows only five circuits, yet owing to the star mesh connection there are 10 phases present (or 20 if conductors carrying opposite currents are counted as opposite phases).

It may now be seen that a winding capable of having 5-phase currents generated in it, and characterized by five maxima in the curve of distribution of its ampere-conductors is required not only for fields of 1 and 4 pole pairs, and 2 and 3 pole pairs rotating in opposite directions, but also for fields of 1 and 6 pole pairs, and so on, rotating in the same direction; and a 7-phase winding with 7 maxima is similarly appropriate to 5 and 2 pole pairs, and so on. Whether a particular winding will serve for two pairs of pole numbers with the greatest economy of the iron depends on the ratio of the flux densities of the component fields $\frac{B_1}{B_2}$ being about the same for both pairs of pole numbers.

The flux density for a winding of given pitch may be calculated on well known principles; convenient formulæ for the types of winding chiefly in question in this specification will be found in a paper read by the applicant before the British Institution of Electrical Engineers on April 12th 1921.

The curve of distribution shows the essential characteristic of the winding to be a definite number $n=P^1+Q^1$ of points of maximum ampere-conductors. A simple type of winding which possesses this characteristic is a single-phase winding for $n=P^1+Q^1$ poles. Such a winding consists of $n$ bands of ampere-conductors alternately opposite in phase (forming $n$ maxima), and as a rule $n$ spaces intermediate between the bands in which the slots are unwound, forming $n$ minima. In such a single phase winding one end of each of the $n$ bands may be joined to a common point, while of the remaining ends the odd ones may all be connected to one terminal and the even to another.

A single phase winding so connected may be regarded as a rudimentary type of cascade winding; for if the two single-phase terminals are short-circuited each of the $n$ poles is independently short-circuited and therefore a balanced system of $n$ phase currents can circulate in them as was previously seen to be necessary for a cascade winding on $P^1$ and $Q^1$ pole pairs. Such a single phase winding may therefore be taken as the basis for constructing a winding which will give more exactly the desired distribution. The winding may be either concentric or of the drum type.

Windings consisting of two superposed windings in which portions may be cancelled or substituted by others may be selected, and the extent of possible cancellation determined, from the considerations next set forth. Where the resultant winding is of the drum type it is to be noted that the pitch is one of the variables at the disposal of the designer; it will partly be determined by calculations similar to those for determining the ratio of the densities of the primary and secondary fluxes, and partly by reference to the ideal curve of distribution. Windings are known which have been derived by superposing two component windings, one for each pole number, cancelling those bars which lie in the same slots and carry equal and opposite currents, compounding bars carrying currents of a certain phase difference and reconnecting the bars of the winding. Windings produced in this manner are completely determined in every respect so that their pitch cannot be varied. The windings according to the present invention are not subject to this limitation and may be produced with widely varying pitches.

It has been pointed out that for a winding to operate on $P^1$ and $Q^1$ pole pairs, it must be capable of carrying currents in $n=P^1+Q^1$ phases, and must therefore be divided into at least $n$ sections. In $n$ such sections (or any sub-multiple of $n$) the order of the phases in a field of $P^1$ pole pairs revolving clockwise is the same as in a field of $Q^1$ pole pairs revolving counter-clockwise. But the winding may contain any multiple of $n$, say $rn$, sections; it may then be treated as $r$ groups of $n$ sections each. Number these groups in clockwise order 1 to $r$. Then if $r=n$ or if $r$ and $n$ have no common factor, changing from $P^1$ pole pairs rotating one way to $Q^1$ pole pairs rotating the other way will change the phase of the $s^{th}$ group by $$\frac{360(s-1)°}{r}.$$

If $n$ and $r$ have a common factor $b$ so that $n=bm$ and $r=bt$, a similar rule applies if the winding be considered as resolved into $br$ groups of only $m$ sections each, $m$ being thus a sub-multiple of $P^1+Q^1$. This rule shows how many sections of two such windings will cancel on superposition. For if $r=2$, then for the second groups ($s=2$), $$\frac{360(s-1)}{r}=180°$$

If, therefore, two windings of $rn$ sections, one having the requisite phases for $P^1$ pole pairs and the other those for $Q^1$ pole pairs rotating in opposite directions, are superposed, the second groups of the two windings will cancel; that is, half the sections cancel on superposition; and for the superposed sections that do not cancel a single section of intermediate phase can be substituted.

Whether the winding resulting from this superposition cancellation and substitution will give good results can be ascertained by drawing the distribution curve in the manner already described. It will sometimes happen that a better approximation to the ideal curve will be given by windings in which not so many as half the sections are cancelled. If $r=4$, $$\frac{360(s-1)}{r}=180°$$

when $s=3$, but not when $s=1$, 2 or 4; hence in this case one quarter of the sections would cancel. Thus if windings for $P^1\ Q^1$ pole pairs respectively are both made up of $r$ $(P^1+Q^1)$ sections, they can be superposed in such a manner that $\frac{1}{r}$th of the sections will be eliminated. The ampere-conductor distribution of a winding compounded in this way can be compared with the ideal curve of ampere-conductors; and slight modifications of the winding, for instance, of its pitch, the effect of which is tested in the manner described above, may be made so as to cause it to yield a curve as close as possible to the ideal.

Finally, curves similar to those of Fig. 1 may be drawn for the windings described with reference to Figs. 2 and 3.

Now the resultant of two unit currents differing in phase by $\theta$ degrees is
$$2 \sin \tfrac{1}{2} (180°-\theta°).$$
Hence the current in any star-connected bar, (for instance the upper conductor of slot 5) is equal to
$$2 \sin \tfrac{1}{2} (180°-36°)$$
times the current in a mesh-connected bar (for instance the lower conductors of slots 7 and 9,
i. e. star current $=2 \sin 72°$ (mesh current)
$=1.9$ (mesh current).

The distribution of ampere-conductors may be examined by means of a diagram like that of Fig. 1. As shown in Fig. 5 draw first two circles of radii in the ratio of 1:1.9; i. e. proportional to the mesh and star currents respectively. Mark on them each of the phase angles that occur in the winding in mesh and star bars respectively; for instance the angles 0°, 180°, 144°, 324° on the inner circle corresponding with the mesh bars in slots 4, 7, 9, 6; and 342° and 162° on the outer circle corresponding with the star bars in slots 5 and 8. At each point thus marked show the numbers of the slots containing bars of that phase, the mesh bars on the inner circle and the star bars on the outer. Then compound all the vectors as 5ª, 5ᵇ, which bear the number of any particular slot, as is shown for slot 5, obtaining the resultant ampere-conductors of the slot which are indicated by a Roman figure, as 7. By joining the ends of these resultants a polygonal distribution diagram (in dotted lines) is obtained showing five lobes, and quite closely approximating to the ideal distribution curve.

Fig. 3 shows the phases of the conductors for 2 and 8 poles when the phase difference between the circuits is 72° or 288° respectively. Fig. 6 shows the distribution of ampere-conductors, obtained in the way just described for Fig. 5, but with circles of radii in the ratio of 1.17:1 which is the ratio of the star to the mesh currents for this case.

What I claim is:—

1. An internal cascade machine comprising a stator and a rotor, polyphase windings on said members which produce fields of different numbers of pole pairs the sum or difference of which, divided by their G. C. M. is greater than three, the winding on one member producing a number of equally spaced maxima of ampere conductors equal to the algebraic difference of the numbers of pole pairs in the two fields (taking account of the relative directions of rotation of the two fields).

2. An internal cascade machine comprising a stator and a rotor, polyphase windings on said members which produce fields of different numbers of pole pairs the sum or difference of which, divided by their G. C. M. is greater than three, the winding on one member producing a number of equally spaced maxima of ampere conductors equal to the algebraic difference of the numbers of pole pairs in the two fields (taking account of the relative direction of rotation of the two fields), and the number of active conductors per slot having a corresponding number of maxima.

3. An internal cascade machine comprising a stator and a rotor, polyphase windings on said members which produce fields of different numbers of pole pairs the sum or difference of which, divided by their G. C. M. is greater than three, the winding on one member producing a number of equally spaced maxima of ampere conductors equal to the algebraic difference of the numbers of pole pairs in the two fields (taking account of the relative directions of rotation of the two fields) and comprising sections connected into a mesh of more than three sides carrying currents of different phases, each side containing two mutually opposed sections connected in series and other sections forming an equal number of star arms, one connected to each angle of the mesh.

4. An internal cascade machine comprising a stator and a rotor, polyphase windings on said members which produce fields of different numbers of pole pairs the sum of difference of which, divided by their G. C. M. is greater than three, the winding on one member producing a number of equally spaced maxima of ampere conductors equal to the algebraic difference of the numbers of pole pairs in the two fields (taking account of the relative direction of rotation of the two fields), and the number of active conductors per slot having a corresponding number of maxima and comprising sections connected into a mesh of more than three sides carrying currents of different phases, each side containing two mutually opposed sections connected in series and other sections forming an equal number of star arms, one connected to each angle of the mesh.

5. An internal cascade machine comprising a stator and a rotor, polyphase windings on said members which produce fields of different numbers of pole pairs the sum or difference of which, divided by their G. C. M. is greater than three the winding on one member producing a number of equally spaced maxima of ampere conductors equal to the algebraic difference of the numbers of pole pairs in the two fields (taking account of the relative directions of rotation of the two fields) and comprising sets of sections connected into a mesh of more than three sides carrying currents of different phases each side containing two mutually opposed sets of sections connected in series and other sections forming an equal number of star arms one connected to each angle of the mesh.

6. An internal cascade machine comprising a stator and a rotor, polyphase windings on said members which produce fields of different numbers of pole pairs the sum or difference of which, divided by their G. C. M. is greater than three the winding on one member producing a number of equally spaced maxima of ampere conductors equal to the algebraic difference of the numbers of pole pairs in the two fields (taking account of the relative directions of rotation of the two fields) and comprising more than three similar and evenly spaced sections corresponding bars of which are subject to E. M. F.'s of different phase.

7. An internal cascade machine comprising a stator and a rotor, polyphase windings on said members which produce fields of different numbers of pole pairs the sum or difference of which, divided by their G. C. M. is greater than three the winding on one member producing a number of equally spaced maxima of ampere conductors equal to the algebraic difference of the numbers of pole pairs in the two fields (taking account of the relative directions of rotation of the two fields) and comprising more than four similar and evenly spaced sections corresponding bars of which are subject to E. M. F.'s of different phase, so that the winding can operate in oppositely rotating fields on more than one pair of pole numbers.

8. An internal cascade machine comprising a stator and a rotor, polyphase windings on said members which produce fields of different numbers of pole pairs the sum or different of which, divided by their G. C. M. is greater than three, the winding on one member producing a number of equally spaced maxima of ampere conductors equal to the algebraic difference of the numbers of pole pairs in the two fields (taking account of the relative direction of rotation of the two fields), and the number of active conductors per slot having a corresponding number of maxima and comprising more than four similar and evenly spaced sections corresponding bars of which are subject to E. M. F.'s of different phase, so that the winding can operate in oppositely rotating fields on more than one pair of pole numbers.

9. An internal cascade machine comprising a stator and a rotor, polyphase windings on said members which produce fields of different numbers of pole pairs the sum or difference of which, divided by their G. C. M. is greater than three, the winding on one member producing a number of equally spaced maxima of ampere conductors equal to the algebraic difference of the numbers of pole pairs in the two fields (taking account of the relative direction of rotation of the two fields), and the number of active conductors per slot having a corresponding number of maxima and said winding also having a number of open circuited sections and means to close the circuits of said sections.

10. An internal cascade machine comprising a stator and a rotor, polyphase windings on said members which produce fields of different numbers of pole pairs the sum or difference of which, divided by their G. C. M. is greater than three, the winding on one member producing a number of equally spaced maxima of ampere conductors equal to the algebraic difference of the numbers of pole pairs in the two fields (taking account of the relative direction of rotation of the two fields), and the number of active conductors per slot having a corresponding number of maxima and comprising sections connected into a mesh of more than three sides carrying currents of different phases, each side containing two mutually opposed sections connected in series and other sections forming an equal number of star arms one connected to each angle of the mesh, and said winding also having a number of open circuited sections and means to close the circuits of said sections.

11. An internal cascade machine comprising a stator and a rotor, polyphase windings on said members which produce fields of different numbers of pole pairs the sum or difference of which, divided by their G. C. M. is greater than three, the winding on one member producing a number of equally spaced maxima of ampere conductors equal to the algebraic difference of the numbers of pole pairs in the two fields (taking account of the relative direction of rotation of the two fields), and the number of active conductors per slot having a corresponding number of maxima and comprising sets of sections connected into a mesh of more than three sides carrying currents of different phases each side containing two mutually opposed sets of sections connected in series and other sections forming an equal number of star arms one connected to each angle of the mesh, and said winding also having a number of open circuited sections and means to close the circuits of said sections.

12. An internal cascade machine comprising a stator and a rotor, polyphase windings on said members which produce fields of different numbers of pole pairs the sum or difference of which, divided by their G. C. M. is greater than three, the winding on one member producing a number of equally spaced maxima of ampere conductors equal to the algebraic difference of the numbers of pole pairs in the two fields (taking account of the relative direction of rotation of the two fields), and the number of active conductors per slot has a corresponding number of maxima and comprising more than four similar and evenly spaced sections corresponding bars of which are subject to E. M. F.'s of different phase so that the winding can operate in oppositely rotating fields on more than one pair of pole numbers, and said winding also having a number of open circuited sections and means to close the circuits of said sections.

13. An internal cascade machine comprising a stator and a rotor, polyphase windings on said members which produce fields of different numbers of pole pairs, the sum or difference of which, divided by their G. C. M. is greater than three the winding on one member producing a number of equally spaced maxima of ampere conductors equal to the algebraic difference of the numbers of pole pairs in the two fields (taking account of the relative directions of rotation of the two fields) and means for connecting points in said winding normally not connected so as to increase the number of circuits in said winding.

14. An internal cascade machine comprising a stator and a rotor, polyphase windings on said members which produce fields of different numbers of pole pairs the sum or difference of which, divided by the G. C. M. is greater than three, the winding on one member producing a number of equally spaced maxima of ampere conductors equal to the algebraic difference of the numbers of pole pairs in the two fields (taking account of the relative directions of rotation of the two fields), means for connecting points in said winding normally not connected, so as to increase the number of circuits in said winding, and said winding also having a number of open circuited sections and means to close the circuits of said sections.

15. In an internal cascade machine comprising a stator and rotor, a winding on one of said members comprising four or more equally spaced pairs of sections connected in series mutually reversed, means to connect the ends of the pairs of sections to form local circuits and means to connect the junction of sections forming one pair with the junctions of sections forming other pairs.

16. In an internal cascade machine comprising a stator and rotor, a winding on one of said members comprising four or more equally spaced pairs of sections connected in series mutually reversed and short circuited, with connections between the winding and terminals, and means for connecting said terminals together, said winding filling part of the slots and having a number of open circuited sections in the remaining slots and means to close the circuits of said sections.

17. An internal cascade machine comprising a stator and a rotor, polyphase windings on said members which produce fields of different numbers of pole pairs the sum or difference of which, divided by their G. C. M. is greater than three the winding on one member producing a number of equally spaced maxima of ampere conductors equal to the algebraic difference of the numbers of pole pairs in the two fields (taking account of the relative directions of rotation of the fields), comprising sections connected into a mesh of more than three sides carrying currents of different phases, each side containing two mutually opposed sections connected in series and other sections forming an equal number of star arms, one connected to each angle of the mesh, resistances and means to connect them between said star arms.

18. An internal cascade machine comprising a stator and a rotor, polyphase windings on said members which produce fields of different numbers of pole pairs the sum or difference of which, divided by the G. C. M. is greater than three the winding on one member producing a number of equally spaced maxima of ampere conductors equal to the algebraic difference of the numbers of pole pairs in the two fields (taking account of the relative directions of rotation of the two fields), and a winding on the other member to co-operate with the winding on the first mentioned member comprising a number of closed circuits, the secondary E. M. F.'s round each of which form nearly balanced polyphase systems and mean for connecting together a plurality of pairs of points in each such circuit to permit the circulation of secondary currents.

19. An internal cascade machine comprising a stator and a rotor, polyphase windings on said members which produce fields of different numbers of pole pairs the sum or difference of which, divided by their G. C. M. is greater than three, the winding on one member producing a number of equally spaced maxima of ampere conductors equal to the algebraic difference of the numbers of pole pairs in the two fields (taking account of the relative directions of rotation of the two fields) and a winding on the other member to co-operate with the winding on the first mentioned member comprising a number of closed circuits and a number of parallels, the secondary E. M. F.'s round each closed circuit forming a nearly balanced polyphase system, while the secondary currents flowing to a junction point of the parallels also form a balanced polyphase system.

20. An internal cascade machine comprising a stator and a rotor, polyphase windings on said members which produce fields of different numbers of pole pairs the sum or difference of which, divided by their G. C. M. is greater than three the winding on one member producing a number of equally spaced maxima of ampere conductors equal to the algebraic difference of the numbers of pole pairs in the two fields (taking account of the relative directions of rotation of the two fields) said winding having tappings by which E. M. F.'s may be taken from it for a winding on the other member, and a second winding on that member connected to the line.

21. In an internal cascade machine comprising a stator and rotor, a winding on one of said members having four similar and evenly spaced sections corresponding bars of which are subject to E. M. F.'s of different phase for use on numbers of pole pairs which when divided by their G. C. M. give quotients of three and one.

22. An internal cascade machine comprising a stator and a rotor, polyphase windings on said members which produce fields of different numbers of pole pairs the sum or difference of which, divided by their G. C. M. is greater than three, the winding on one member producing a number of equally spaced maxima of ampere conductors equal to the algebraic difference of the numbers of pole pairs in the two fields (taking account of the relative directions of rotation of the two fields) and polyphase windings on the other member to co-operate with a winding on the first mentioned member adapted for three pole numbers and capable of simultaneous use as a secondary with a resistance control on two of them.

23. An internal cascade machine comprising a stator and a rotor, polyphase windings on said members which produce fields of different numbers of pole pairs the sum or difference of which, divided by their G. C. M. is greater than three, said numbers of pole pairs being such that when divided by their G. C. M. they give quotients which are both odd, and a single winding on one member producing a number of equally spaced maxima of ampere conductors equal to the algebraic difference of the numbers of pole pairs in the two fields (taking account of the relative directions of rotation of the two fields).

24. An internal cascade machine comprising a stator and a rotor, polyphase windings on said members which produce fields of different numbers of pole pairs the sum or difference of which, divided by their G. C. M. is greater than three, said numbers of pole pairs being such that when divided by their G. C. M. they give quotients which are both odd, and a single winding on one member producing a number of equally spaced maxima of ampere conductors equal to the algebraic difference of the numbers of pole pairs in the two fields (taking account of the relative directions of rotation of the two fields), and a winding on the other member to be connected to the line and also to act as a secondary.

In testimony whereof I have signed my name to this specification.

FREDERICK CREEDY.